(12) United States Patent
DosRamos

(10) Patent No.: US 12,436,079 B2
(45) Date of Patent: Oct. 7, 2025

(54) ACOUSTIC PARTICLE SIZER DIP PROBE AND SAMPLE HOLDER

(71) Applicant: Mass Applied Science, LLC, Hopedale, MA (US)

(72) Inventor: Jose Gabriel DosRamos, Hopedale, MA (US)

(73) Assignee: Mass Applied Science, LLC, Hopedale, MA (US)

( * ) Notice: Subject to any disclaimer, the term of this patent is extended or adjusted under 35 U.S.C. 154(b) by 439 days.

(21) Appl. No.: 17/531,085

(22) Filed: Nov. 19, 2021

(65) Prior Publication Data

US 2023/0160803 A1    May 25, 2023

(51) Int. Cl.
*G01N 15/10*    (2024.01)
*G01N 15/00*    (2024.01)
(Continued)

(52) U.S. Cl.
CPC ............ *G01N 15/10* (2013.01); *G01N 15/02* (2013.01); *G01N 29/032* (2013.01);
(Continued)

(58) Field of Classification Search
CPC .. G01N 2291/045; G01N 15/02; G01N 15/10; G01N 2015/0053; G01N 2015/1029; G01N 2291/015; G01N 2291/022; G01N 2291/02416; G01N 2291/101; G01N 2291/102; G01N 2291/106; G01N 29/02;
(Continued)

(56) References Cited

U.S. PATENT DOCUMENTS 5,245,290 A * 9/1993 Cannon ................ G01N 29/348
                                                    324/72
6,151,956 A * 11/2000 Takahashi ............ G01N 29/024
                                                    73/61.49
(Continued)

FOREIGN PATENT DOCUMENTS

CN    106959262 A * 7/2017 ............. G01N 15/06
DE    10317807 A1 * 11/2004 ........... G01N 29/032
(Continued)

OTHER PUBLICATIONS

Acoustic Particle Sizer, APS-100, Particle Sizing Without Dilution, pp. 1-2, www.massappliedscience.com.
(Continued)

*Primary Examiner* — David L Singer
(74) *Attorney, Agent, or Firm* — Miele Law Group

(57) ABSTRACT

An ultrasonic pulse transmitter is provided that is configured to transmit an ultrasonic pulse through a target liquid medium. A receiver is also provided. Per one embodiment, a reflector is coupled to an automated positioner that moves the reflector to select different positions at select distances from an ultrasonic transceiver. A holder is provided that is configured to maintain the pulse transmitter at a controlled position in relation to the target liquid medium, and that is configured to be carried. In one embodiment of a method, ultrasonic pulses are transmitted through a target liquid medium. The transmitted ultrasonic pulses are then received. A vessel is provided to hold the liquid medium without the use of a seal on the vessel.

12 Claims, 12 Drawing Sheets

(51) Int. Cl.
  *G01N 15/02* (2024.01)
  *G01N 29/032* (2006.01)
  *G01N 29/22* (2006.01)
(52) U.S. Cl.
  CPC ... *G01N 29/226* (2013.01); *G01N 2015/0053* (2013.01); *G01N 2015/1029* (2024.01); *G01N 2291/015* (2013.01); *G01N 2291/022* (2013.01); *G01N 2291/02416* (2013.01); *G01N 2291/045* (2013.01)
(58) Field of Classification Search
  CPC ... G01N 29/032; G01N 29/222; G01N 29/226
  See application file for complete search history.

(56) References Cited

U.S. PATENT DOCUMENTS

| | | |
|---|---|---|
| 6,604,408 B2 | 8/2003 | DosRamos et al. |
| 7,984,642 B2 | 7/2011 | Africk et al. |
| 9,046,458 B2 | 6/2015 | DosRamos et al. |
| 2002/0121130 A1 | 9/2002 | DosRamos et al. |
| 2004/0060356 A1* | 4/2004 | Scott .................. G01N 15/0255 73/865.5 |
| 2006/0178581 A1* | 8/2006 | Africk .................. G01N 15/02 600/440 |
| 2009/0158821 A1* | 6/2009 | Sun ...................... G01N 29/024 73/61.75 |
| 2009/0158822 A1* | 6/2009 | Sun ...................... G01N 29/222 73/1.83 |
| 2013/0247656 A1* | 9/2013 | DosRamos ............ G01N 15/02 73/61.75 |

FOREIGN PATENT DOCUMENTS

| | | | | |
|---|---|---|---|---|
| DE | 102008014300 A1 | * | 9/2009 | ........... G01N 29/024 |
| DE | 102011115691 A1 | * | 4/2013 | ............. G01N 11/00 |

OTHER PUBLICATIONS

Jia Nan et al., Particle Size Distribution Measurement Based on Ultrasonic Attenuation Spectra Using Burst Superposed Wave, Results in Physics 13 (2019) 102273, pp. 1-7.

* cited by examiner

ACOUSTIC PARTICLE SIZER DIP PROBE AND SAMPLE HOLDER

FIELD OF THE DISCLOSURE

Aspects of the present disclosure relate to apparatus and methods used for or in acoustic particle sizing. Aspects of the disclosure relate to inspecting liquid mediums in various manufacturing processes.

BACKGROUND OF THE DISCLOSURE

In various industrial processes, acoustic particle sizers are used to ultrasonically categorize particles in a liquid medium. The liquid medium may include one or more colloids or dispersions. For example, when making ink, pigment particles are milled to a desired size. As part of a quality control phase of the manufacturing process, a particle size analyzer is employed to determine the particle size distribution.

SUMMARY OF THE DISCLOSURE

With some particle sizer systems, it is necessary to divert a sample of the liquid medium into a sample vessel comprising a seal—e.g., an O-ring. The seal comes into contact with each sample, which can result in sample cross-contamination. When contamination occurs, oversize particles from a prior reading could show up in a current reading, resulting in a false positive.

An objective of the present disclosure is to eliminate the need to divert the sample from a manufacturing process. Another objective is to provide a probe and sample vessel approach that eliminates or greatly reduces the occurrence of cross contamination between different batches. Other alternative or additional objectives may be served by one or more aspects of the disclosure, e.g., as may become apparent from the following disclosure.

Embodiments of the disclosure include any apparatus, machine, system, method, articles (e.g., computer-readable media), or any one or more subparts or subcombinations of such apparatus (singular or plural), system, method, or article, for example, as supported by the present disclosure.

One embodiment of the present disclosure is directed to apparatus. At least one ultrasonic pulse transmitter is provided that is configured to transmit an ultrasonic pulse through a target liquid medium. At least one ultrasonic receiver is also provided. A holder is provided that is configured to maintain the pulse transmitter at a controlled position in relation to the target liquid medium, and that is configured to be carried.

In one embodiment of a method, ultrasonic pulses are transmitted through a target liquid medium and then received, with one or more transmitters and one or more receivers. The reflected ultrasonic pulses are then received. A vessel is provided to hold the liquid medium without the use of a seal on the vessel.

BRIEF DESCRIPTION OF THE DRAWINGS

Example embodiments will be described with reference to the following drawings, in which.

DETAILED DESCRIPTION

Figure 1:
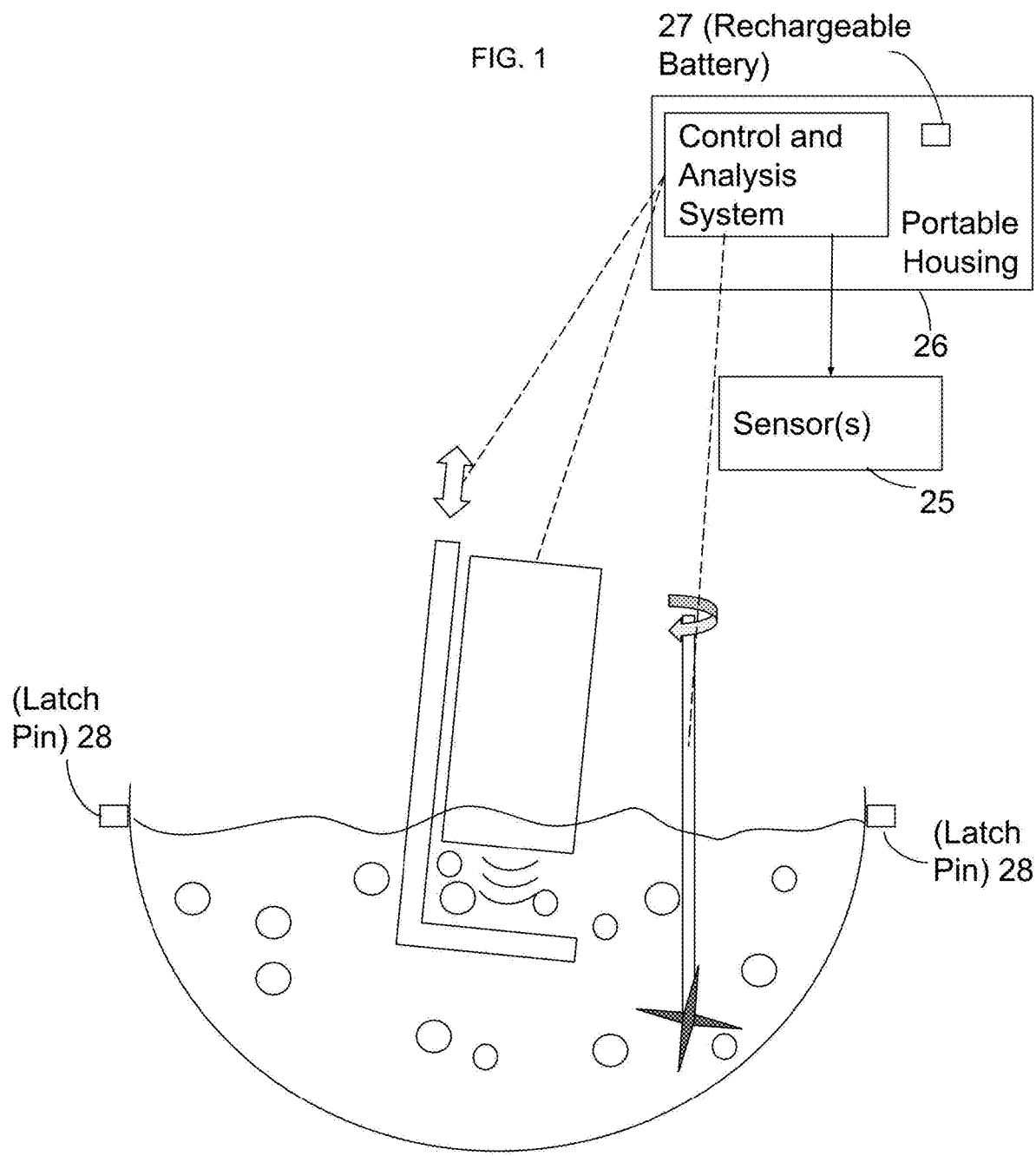
FIG. 1 is schematic diagram of one embodiment of a particle sizer system.

In accordance with one or more embodiments herein, various terms may be defined as follows.

Program. A program includes software of a processing circuit.

Processing circuit. A processing circuit may include both (at least a portion of) computer-readable media carrying functional encoded data and components of an operable computer, including one or more processors, a bus structure, and a memory system. The operable computer is capable of executing (or is already executing) the functional encoded data, and thereby is configured when operable to cause certain acts to occur. A processing circuit may also include: a machine or part of a machine that is specially configured to carry out a process, for example, any process described herein; or a special purpose computer or a part of a special purpose computer. A processing circuit may also be in the form of a general purpose computer running a compiled, interpretable, or compilable program (or part of such a program) that is combined with hardware carrying out a process or a set of processes. A processing circuit may further be implemented in the form of an application specific integrated circuit (ASIC), part of an ASIC, or a group of ASICs. A processing circuit may further include an electronic circuit or part of an electronic circuit. A processing circuit does not exist in the form of code per se, software per se, instructions per se, mental thoughts alone, or processes that are carried out manually by a person without any involvement of a machine.

User interface tools; user interface elements; output user interface; input user interface; input/output user interface; and graphical user interface tools. User interface tools are human user interface elements which allow human user and machine interaction, whereby a machine communicates to a human (output user interface tools), a human inputs data, a command, or a signal to a machine (input user interface tools), or a machine communicates, to a human, information indicating what the human may input, and the human inputs to the machine (input/output user interface tools). Graphical user interface tools (graphical tools) include graphical input user interface tools (graphical input tools), graphical output user interface tools (graphical output tools), and/or graphical input/output user interface tools (graphical input/output tools). A graphical input tool is a portion of a graphical screen device (e.g., a display and circuitry driving the display) configured to, via an on-screen interface (e.g., with a touchscreen sensor, with keys of a keypad, a keyboard, etc., and/or with a screen pointer element controllable with a mouse, toggle, or wheel), visually communicate to a user data to be input and to visually and interactively communicate to the user the device's receipt of the input data. A graphical output tool is a portion of a device configured to, via an on-screen interface, visually communicate to a user information output by a device or application. A graphical input/output tool acts as both a graphical input tool and a graphical output tool. A graphical input and/or output tool may include, for example, screen displayed icons, buttons, forms, or fields. Each time a user interfaces with a device, program, or system in the present disclosure, the interaction may involve any version of user interface tool as described above, e.g., which may be a graphical user interface tool.

Referring now to the drawings in greater detail, FIG. 1 is a schematic diagram of a particle sizer system 10. The illustrated system 10 includes a dip probe which comprises an ultrasonic transducer 14 and a multiple position reflector 16. A control and analysis system 24, sensor(s) 23, and a sample mixer 20 are also provided.

The multiple position reflector 16 is connected to a translation stage 22 for controlling the position of a reflector surface 17. In the illustrated embodiment, the reflector surface 17 is a stainless steel acoustic reflector (mirror). Its position is controlled to be at multiple positions (gaps) for each sample, in order to produce robust attenuation data used for determining particle size. Reflector 16 is held by a reflector holder bar 15 made of stainless steel in the embodiment. Translation stage 22 comprises a vertical programmable high precision motion/translation stage that adjusts the reflector-transducer gap. In the illustrated embodiment, translation stage 22 connects to a control and analysis system 24, which may be a processing circuit as described above. Control and analysis system 24 carries a program or logic to control the operation of the different parts of system 10, and to receive and analyze sensed signals via sensor(s) 23, the position of the reflector(s) 17, and reflected ultrasonic pulses that have traversed the liquid medium 18.

The liquid medium 18 being tested includes solid particles or emulsion droplets 19, the sizes of which are to be determined by the system. In this embodiment, a removable sample-cell cup 12 is provided which is held in place by a plurality of latch pins 28. The illustrated cup 12 is free of any sensor openings in the side walls, and also does not have (or require) a seal such as an O-ring. By removing the use of a seal such as an O-ring, cross-contamination is reduced. Removing or minimizing the openings in the side walls of the vessel also reduces contamination risks from one sample to another. In addition, it is easier to clean the cup between samples. For example, the cup can be wiped and washed in a sink. It is also possible to simply replace the vessel with a new vessel, and the cost of the vessel is lower because of its simpler design. Per one embodiment, multiple pre-filled sample cups can be used, to allow for faster analysis of multiple samples.

Per another embodiment, a handheld dip type probe is provided. The instrument operator can conveniently dip the sensor into operator-supplied sample cups without being restricted to a particular sample cup. The sensor can also be used to test liquid mediums in various industrial processes, without requiring removal or dilution (or interruption) of the liquid from the industrial process. A dip type sensor may be conveniently cleaned between samples.

The illustrated system 10 may be part of a complete assembly, with the control and analysis component 24 provided in an attached housing. The control and analysis component may be provided in a portable housing 26 and equipped with a rechargeable battery 27 for in-field testing.

The systems, methods, and structures disclosed herein may be used to ultrasonically categorize particles in a liquid medium by size range. The liquid medium may be one or more colloids and/or dispersions. More specifically, the systems and methods may be configured to allow measurement of respective sizes of particles in a liquid medium, to produce data and graphical representations showing particle size distribution, solids concentration, and other related information. In select embodiments, the liquid medium is undiverted from its presence in an industrial process, in a process plant pipe, and/or in a chemical reactor. A dip type probe, e.g., may be used to test ink during the manufacture of the same. There is no need to dilute the liquid medium from its normal state in the manufacturing process. A dip type probe as disclosed may also be used in a process of manufacturing a semiconductor, to measure an abrasive slurry used to polish the surface of the semiconductor.

In one or more embodiments disclosed herein, ultrasonic transmitters and/or receivers are neither attached to, nor fixed in relation to, nor touching the sample holder which may be, for example, a cell, vessel, or cup. It is also possible to carry out the embodiments without providing any openings in the side walls of the container.

Figure 2:
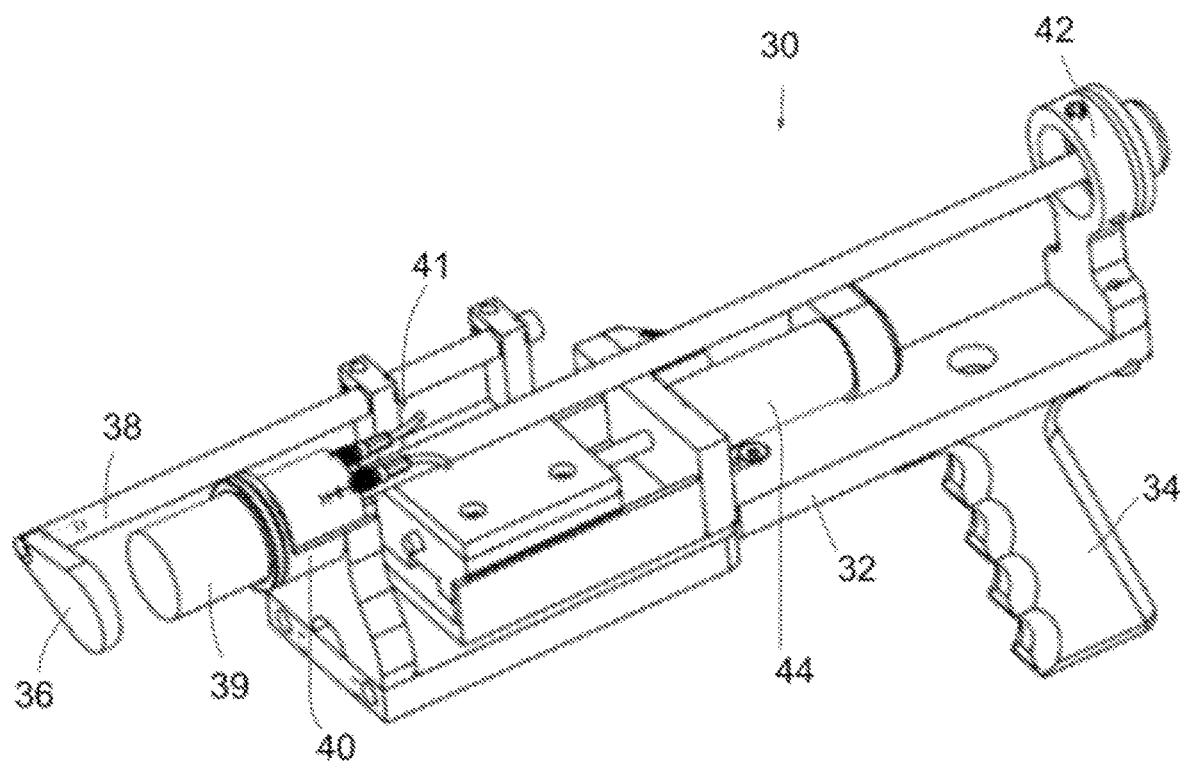
FIG. 2 is a perspective view of one embodiment of an acoustic particle sizer dip probe.

FIG. 2 shows another embodiment of a dip type acoustic particle sizer 30. Generally, the illustrated dip type sizer includes an ultrasonic pulse source (a transceiver type transducer 39) configured to both transmit an ultrasonic pulse through a target liquid medium, and to receive pulses reflected back from a reflector 36. A holder structure 32 is provided to carry the assembly. The illustrated sizer 30 also has a handle 34 for allowing an operator to manually hold and insert the probe into a liquid medium to be tested.

As shown, the illustrated sizer 30 includes a holder structure (sometimes referred to herein as a base) 32 with one or more holders to hold a reflector 36, a reflector positioner 44, and transducer 39. The holders as shown more specifically include a transducer yoke 40 for holding transducer 39, and an alignment yoke 42 for aligning the direction of transducer 39, where the transducer is held by a longitudinal shaft. Control/input and output wires 41 are coupled to the transducer, allowing for operation of the transducer and for porting of measured signals to a control and analysis system (not shown in this figure).

In this embodiment, the reflector structure includes one reflector 36, with a reflective surface, e.g., as described above in the embodiment of FIG. 1. This portion of the reflector is held by a movable reflector rod 38 that is held by a reflector positioner structure 44. In this embodiment, reflector positioner structure 44 is a programmable high precision motion/translation stage used to adjust the reflector-transducer gap. The programming of this positioner may be implemented by means of software or circuitry in the structure 44, and/or in the control and analysis system. While such a system is not shown in this figure, one may be provided as described above with respect to FIG. 1.

Figure 3:
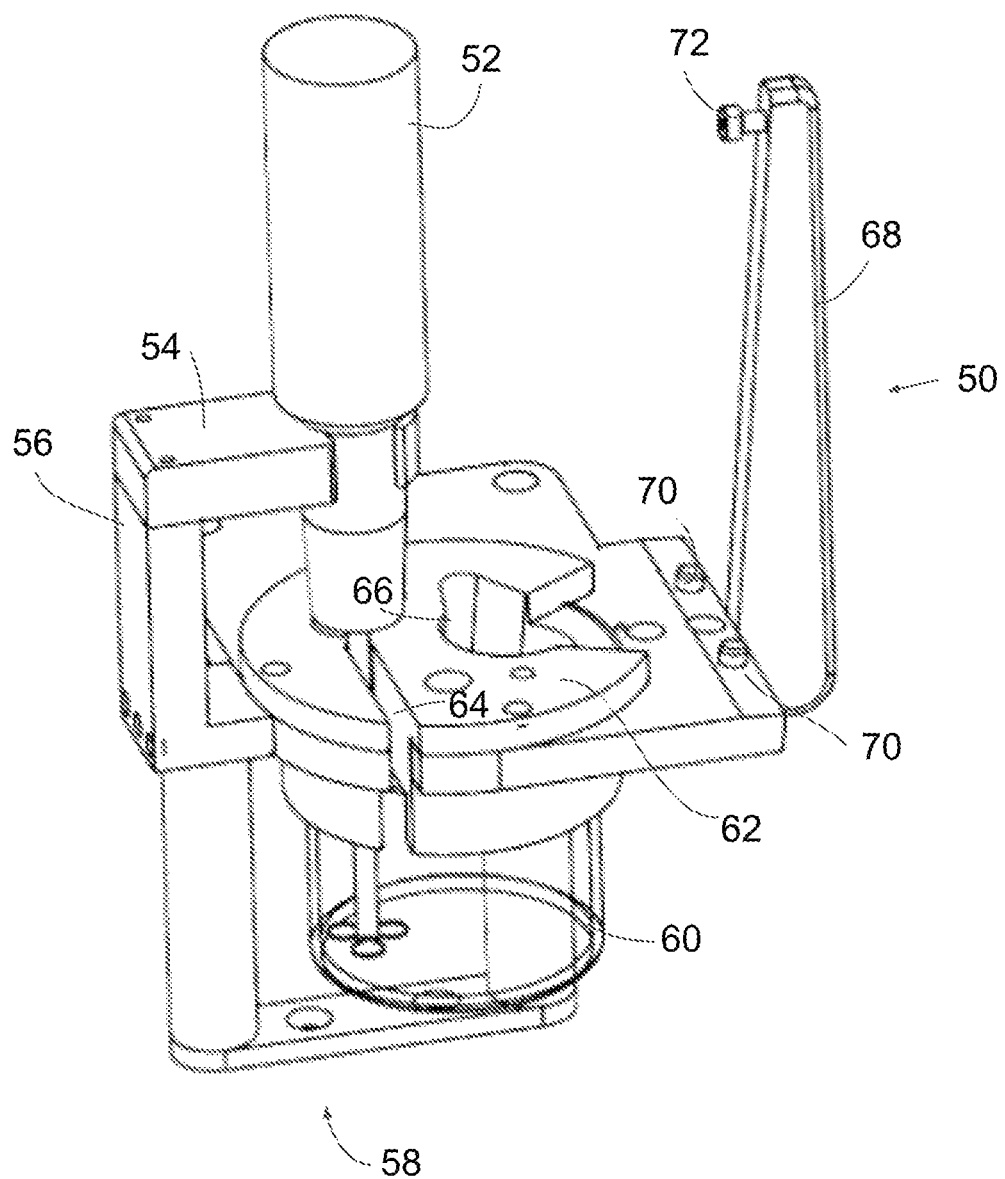
FIG. 3 is a perspective view of a sample station.

FIG. 3 shows an embodiment of a sample station 50 that can be used with the probe shown in FIG. 2. The illustrated station 50 includes a support frame 58 that carries a removable sample cup 60. The sample cup may be secured to the support frame 58, e.g., with the use of removable pins. A mixer holder 56 is provided that carries a mixer yoke 54 that carries a sample mixer 52. A sample protective shield 62 is provided in this embodiment, which has a mixer slot 64 that allows for the rotatable mixer shaft to enter the liquid area in the cup. A probe slot 66 is also provided for receiving the probe, e.g., the extended reflector and transducer portions of the sizer shown in FIG. 2.

Figure 4:
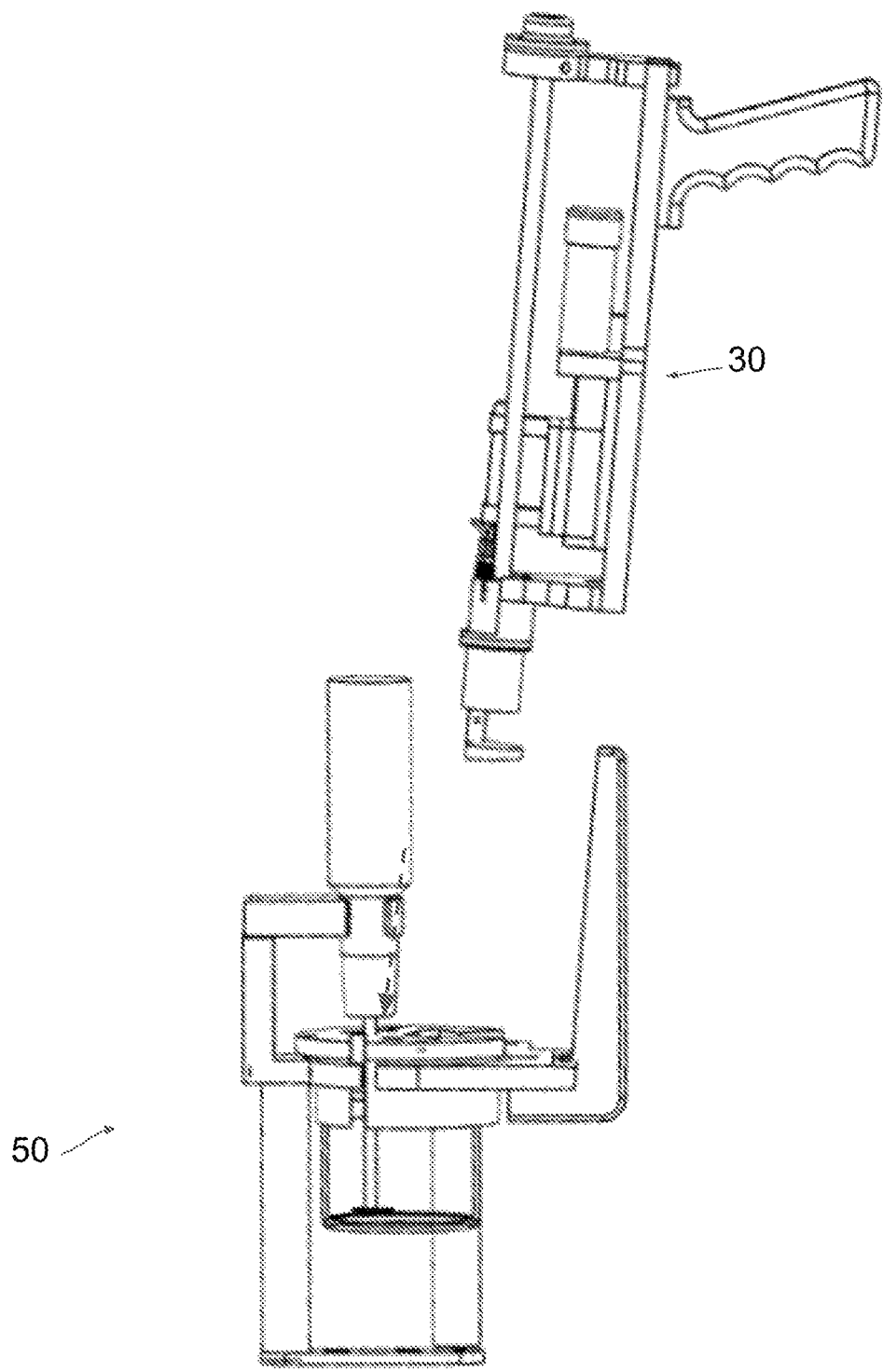
FIG. 4 shows the illustrated dip probe and sample station in alignment before inserting the dip probe into an opening leading to liquid in the sample cup.
Figure 5:
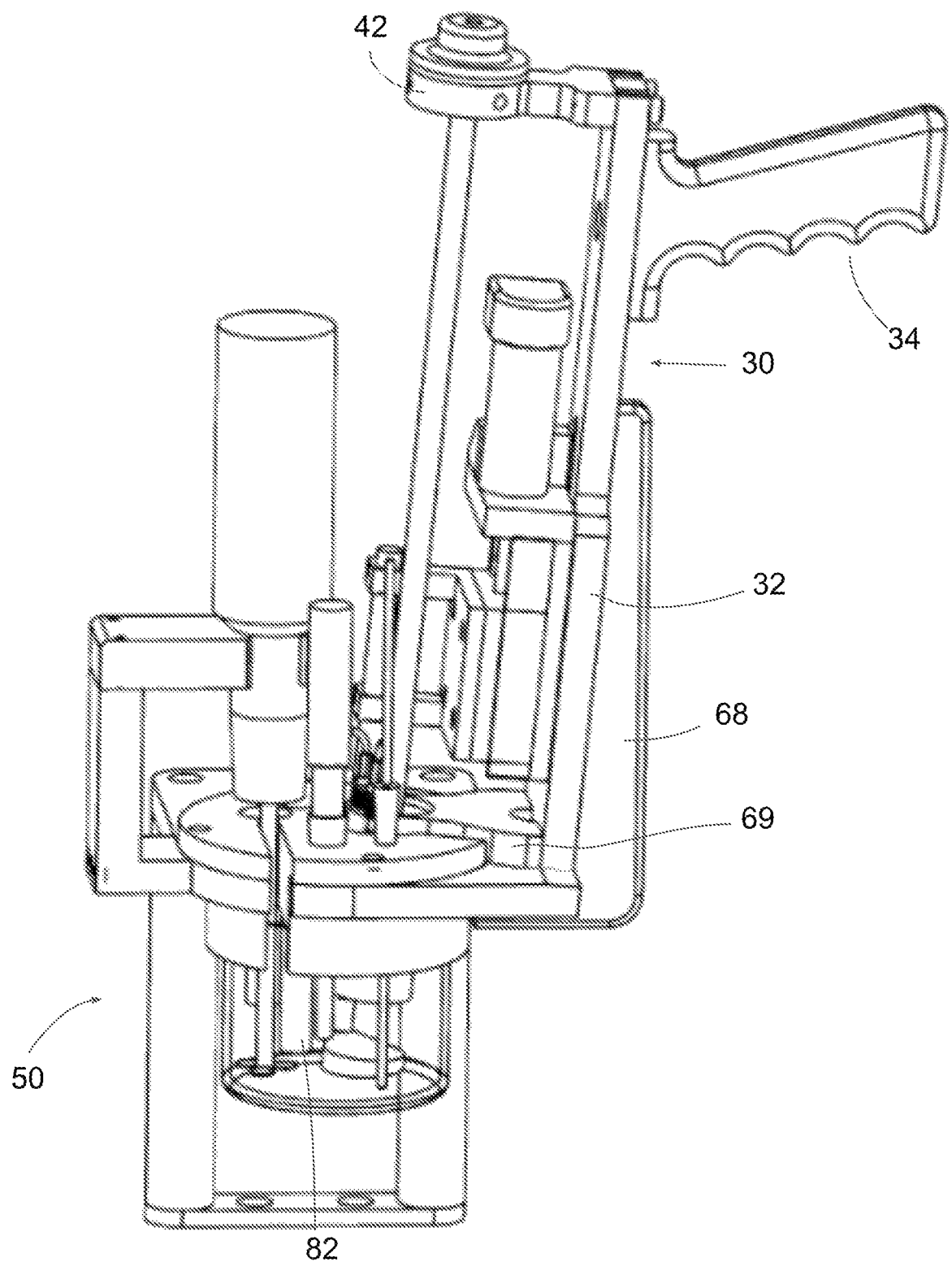
FIG. 5 shows the illustrated dip probe and sample station, with the probe fully inserted and releasably secured on a probe mount.

The illustrated sample station 50 further includes a probe mount 68 for holding a probe when it is inserted in place, as further shown in FIGS. 4 and 5. Mount interface pins 70 and a flanged pin 72 are configured to receive the dip probe, by interfacing with corresponding and mated recesses in the probe.

FIGS. 4 and 5 show how the sizer 30 (of FIG. 2) may be interfaced with the sample station 50 (of FIG. 3). The sizer 30 and sample station 50 in FIGS. 4 and 5 correspond to the same elements in FIGS. 1 and 2, with different perspective views and modes of assembly/use. FIG. 4 shows a position in which the probe is ready to be interfaced with the sample station. FIG. 5 shows the position in which the probe has been fully inserted and securely (removably) mounted via pins 70 and 72 shown in FIG. 3. Specifically, as the probe is lowered, its base 32 is brought into contact with the flat surface of probe mount 68. In the embodiment shown, base 32 has a slot configured to receive the flanged pin 72 shown in FIG. 3. Once the flanged pin 72 has fully engaged with the slot, the end portion of base 32 will engage with pins 70 (FIG. 3) via mating recesses on the end of base 32 (not visible in the drawing). As shown in FIG. 5, additional sensors may be added. For example, one or more probes 82 may be inserted into the liquid medium portion of the cup, e.g., through an opening in the protective shield 62.

Figure 6:
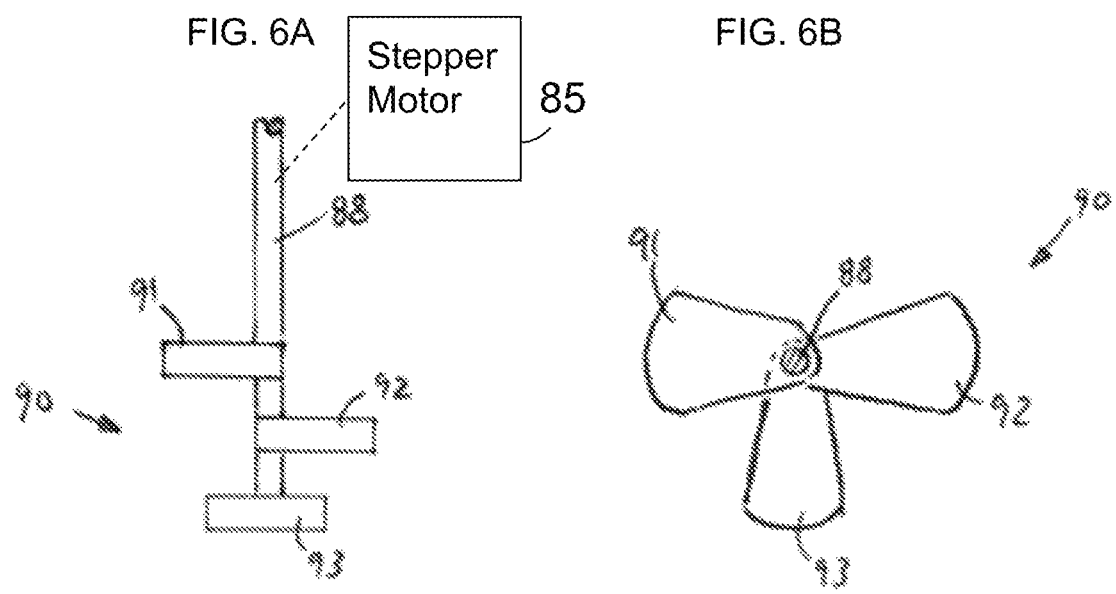
FIGS. 6A and 6B show side and top views of an alternative embodiment of a reflector.
Figure 7:
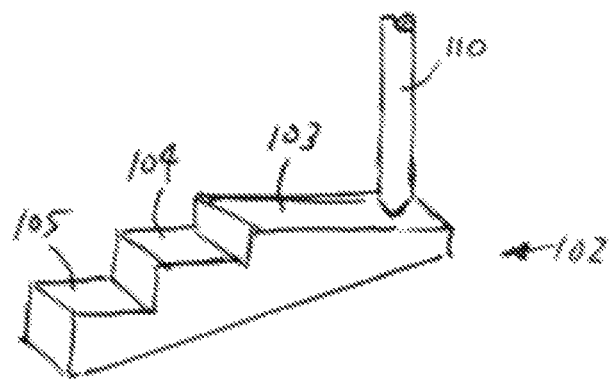
FIG. 7 shows a perspective view of another embodiment of a reflector.

FIGS. 6A, 6B, and 7 show different embodiments of a reflector structure that may be used. FIG. 6A shows a side view, and FIG. 6B shows a cut-away top view. In FIGS. 6A and 6B, the reflector 90 has reflector surfaces 91, 92, and 93, which may be configured as described above with respect to FIG. 1, i.e., as stainless steel acoustic reflective surfaces. The surfaces are held by a rotatable shaft 88. In operation, these reflective surfaces are moved to be beneath the acoustic pulses transmitted by the transducer, e.g., by rotating the shaft per one embodiment. A step or stepper motor 85 may be used to control the position of reflector 90. A step or stepper motor in this embodiment is possible, because less resolution is required for positional adjustment. This embodiment is therefore less expensive than the embodiment with a translation stage.

FIG. 7 shows a perspective view of a reflector structure 102. A unitary member is provided holding fixed position reflector surfaces 103, 104, and 105. The unitary member is held by a shaft 110. In this embodiment, it is expected that the transducer will have a broader transmission path, and will be configured to transmit ultrasonic pulses at all three of the reflector surfaces 103, 104, and 105 (optionally) simultaneously, and receive reflected signals therefrom.

Figure 8:
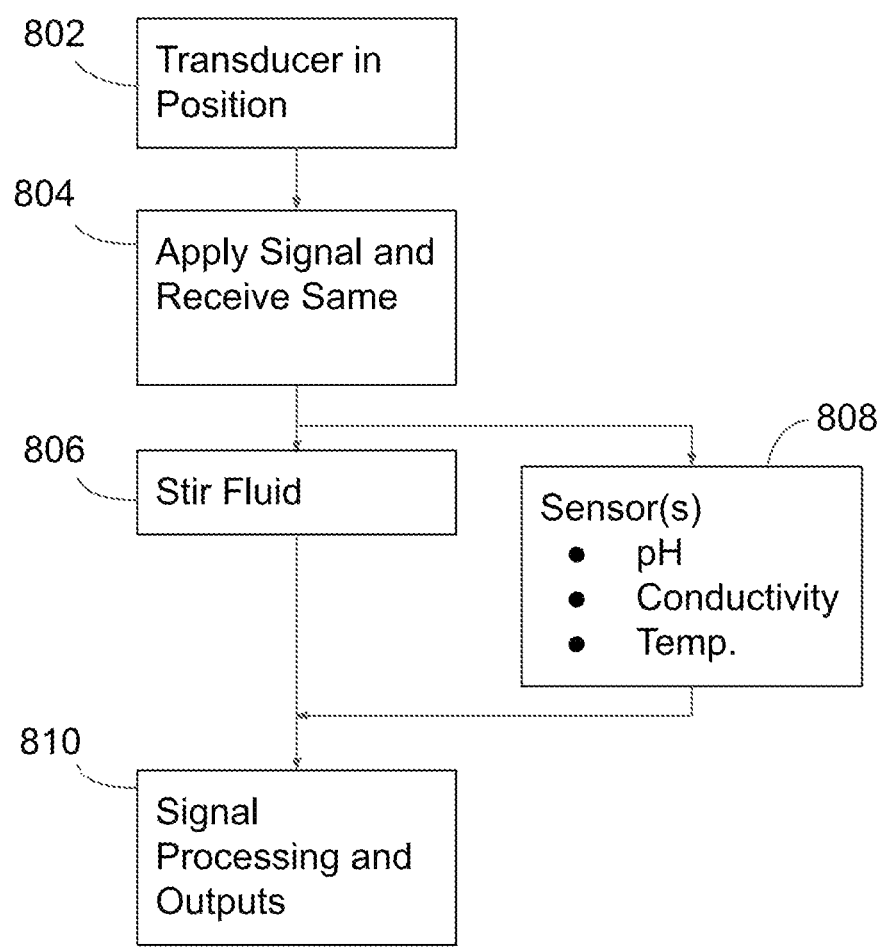
FIG. 8 is a flow chart of a general process to ultrasonically categorize dispersed particles.

While three surfaces are shown in these embodiments, it is possible to provide a smaller or larger number of differently spaced reflective surfaces. Each surface in these embodiments corresponds to a given reflector-transducer gap. It is also possible to move (or not move) these assemblies vertically to adjust each gap or add additional gaps, FIG. 8 shows generally the process of testing that may be controlled by a control and analysis system as described above. In an initial act 802, the transducer is put in position (the liquid medium typically will have already been put in the vessel)—as shown in FIG. 5 for that manual embodiment. Alternatively, a mechanical engagement mechanism may be provided for engaging the probe with the liquid medium. In act 804, the ultrasonic pulses are applied, and the reflected pulses are received at each desired transmission path length. At acts 860 (generally concurrent with act 804), the fluid is stirred and one or sensors 808 are operated (e.g., pH, conductivity, temperature, and/or other). At act 810, signal processing and outputs occur.

Figure 9:
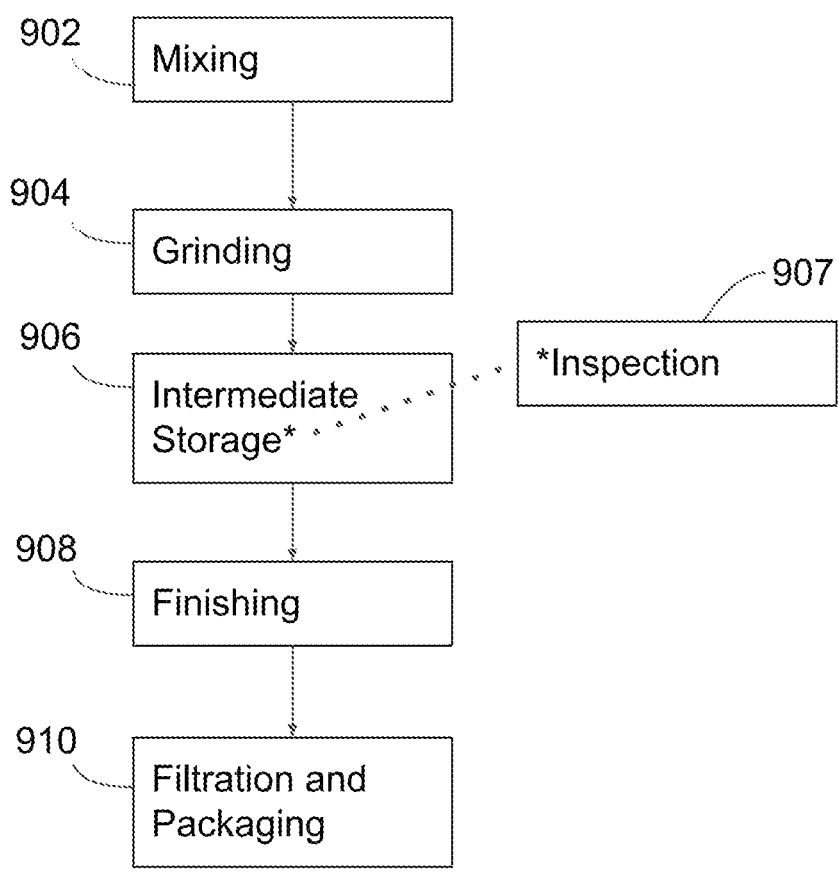
FIG. 9 is a flow chart of an ink manufacturing process.

FIG. 9 shows an example ink manufacturing process, where an inspection is carried out using the probe and vessel embodiment described herein. In this illustrated embodiment, the liquid may be sampled and put in a reusable or disposable vessel, e.g., as shown in FIG. 1 or FIG. 3. Alternatively, the dip probe may be inserted into the liquid medium in its undiverted state in the manufacturing process.

In act 902, mixing occurs, e.g., of solvent, resins, and additives. Then in Act 904, grinding occurs. For example, a dispersing process is carried out involving wetting, grinding, and dispersing of a pigment. Act 906, the liquid medium is in an intermediate storage location. At this stage, an inspection 907 may be carried out without diverting the liquid medium, to determine if the particles in the medium are within a desired size range. In later acts 908 and 910, finishing and filtration and packaging occur.

Figure 10:
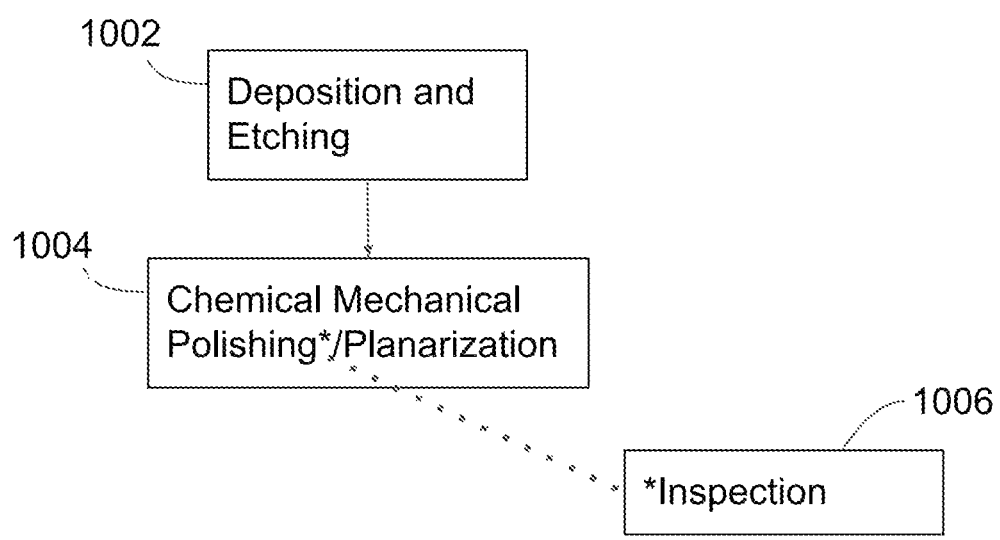
FIG. 10 is a flow chart of a process of manufacturing semiconductor wafers/chips including use of a chemical mechanical polishing.

FIG. 10 shows a process of manufacturing a semiconductor chip or die, simplified for purposes of showing the pertinence of the inspection of particle size in that process. In act 1002, deposition and etching occur, where insulative and conductive layers are put in place. Afterwards and interposed in stages of the deposition and etching phases, chemical mechanical polishing/planarization is carried out. This involves the use of an abrasive slurry to polish and thereby planarize the applicable surface at the pertinent point in the process. At this point, at act 1006, some liquid could be diverted for testing as described above, or the probe could be inserted into a vessel used to store the slurry leading up to and during the polishing process, and the particle sizes can be determined without diversion.

Figure 11:
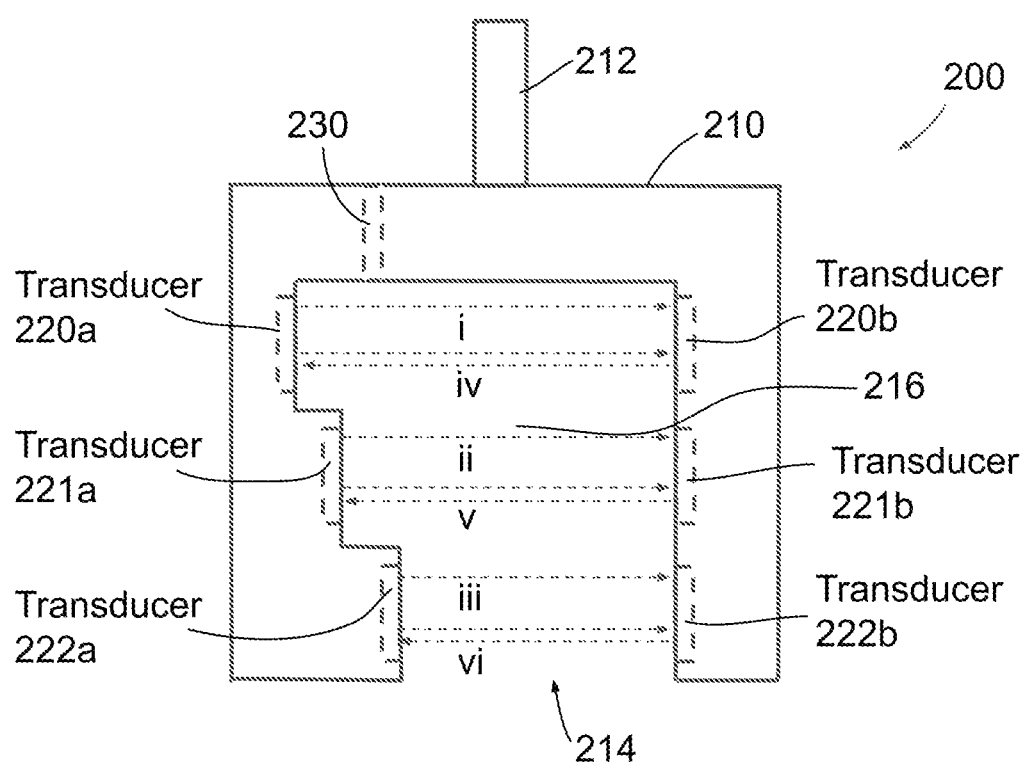
FIG. 11 is a side view of a portion of an example embodiment of a vertically arranged dip probe.

FIG. 11 is a side view of a cutaway portion of a vertically arranged dip probe 200. A transducer housing structure 210 (U-shaped in the example) is provided that is carried by a shaft 212 (shown cutaway in the figure). The probe 200 is shown in its upright position as it would be when dipped down into a liquid being tested. The housing structure 210 has a lower opening 214 and a central cavity 216 for receiving the liquid. The embodiment contemplates that there will be pairs of transducers that face each other, while each transducer is operable in a transmit mode, a receive mode, or a transceiver mode. In another embodiment, transducers are provided on one side (the left or right side in the version shown in FIG. 11), and the paired surface opposite each transducer is a reflective surface.

The illustrated embodiment has an uppermost pair of ultrasonic transducers 220a and 220b, a middle pair 221a and 221b, and a lower pair 222a and 222b. Each transducer is operable in a transceiver mode, where it transmits to the opposite surface and receives sound waves reflected back from the opposite surface. Each transducer is also operable to be in a passive mode, where it only reflects sound waves it receives, or in a receive mode where it receives and transduces the sound waves directed at it from the opposite side transducer. Each transducer may also be operated in a transmit mode. In the illustrated embodiment, the transducer surfaces are exposed, but sealed at their periphery so that liquid will not leak into housing structure 210. The transducers may be cylindrical in shape, with a flat planar surface directed at the opposite surface.

In the embodiment as shown, with three pairs of transducers, six or more different length gaps may be provided to measure traversing sound waves. The paths for the sound waves for the size gaps are shown in FIG. 11 as paths i-vi. As the probe is dipped into the liquid, air is allowed to escape via an air vent cavity 230. The illustrated probe is easily cleaned, as there are no exposed wires or other structures.

It is possible to vary the embodiment of FIG. 11, by arranging the surfaces and transducers horizontally or at an angle. In addition, a differently shaped housing or no housing may be provided. If there is no housing, or if the housing exposes wires to and from the transducers, the wires may be encased in a chemically resistant conduit. The probe and wires may generally be cleaned with the same solvent used to mix the particles.

Figure 12A:
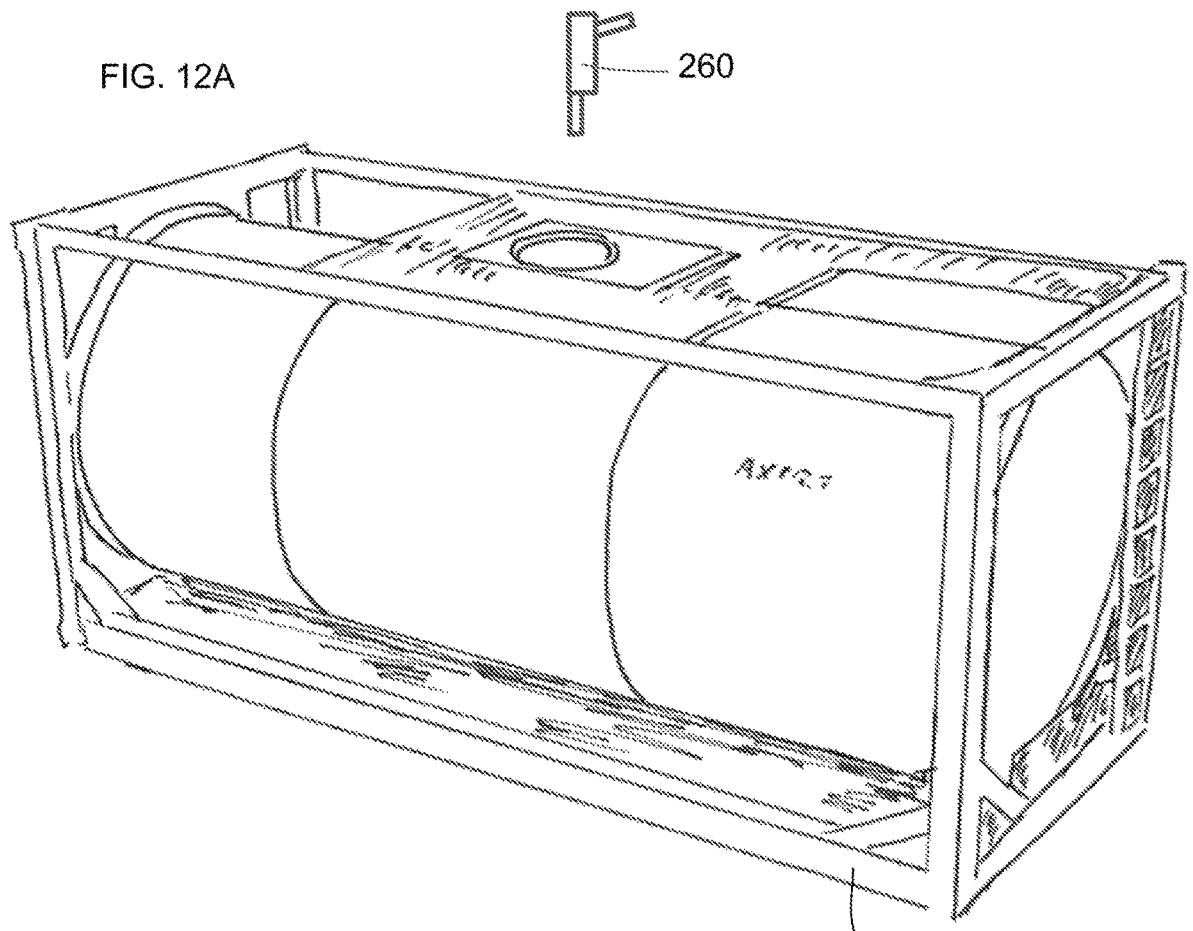
FIGS. 12A and 12B are perspective views of containers holding a liquid in transit for testing with a hand-held probe.

FIG. 12A shows a transit liquid container for carrying a liquid on a ship, truck, or train. The illustrated container 250 may be provided with a rectangular support structure 252 for supporting the tank-type container 250. An opening 254 is provided at the top of the tank 250 for allowing access to the container's liquid freight. When the cover (not shown) is removed from opening, a hand-held probe 260 may be inserted into the container at a level where the transducer and gap(s) portions of the probe are immersed into the liquid. The power and control portion of the analysis system, e.g., as shown in 1, may be contained in a portable carrier (e.g., a backpack carried on the human operator's back). The probe 260 may be connected to the power and control portion via wires in the embodiment.

Figure 12B:
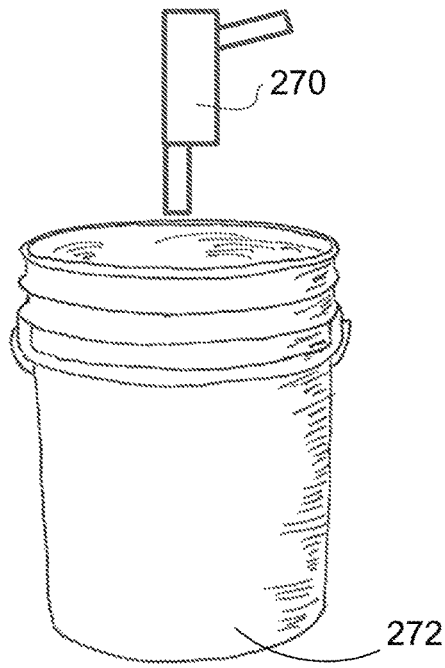

FIG. 12B shows how a probe 270, also configured to be portable as described above with respect to FIG. 12A (with, for example, a backpack carried power and control unit), may be dipped into liquid carried in a bucket 272 when the bucket's cover (not shown) is temporarily removed. Such a bucket may be in transit on a truck, train, ship or at an industrial plant or warehouse.

The claims, as originally presented and as they may be amended, encompass variations, alternatives, modifications, improvements, equivalents, and substantial equivalents of the embodiments and teachings disclosed herein, including those that are presently unforeseen or unappreciated.

What is claimed is:

1. Apparatus comprising:
a dip type probe comprising at least one ultrasonic pulse transmitter configured to transmit an ultrasonic pulse through a target liquid medium, at least one ultrasonic receiver configured to receive the ultrasonic pulse transmitted through the target liquid medium, and at least one reflector configured to reflect the ultrasonic pulse transmitted through the target liquid medium in order to redirect and cause the ultrasonic pulse to reach the at least one ultrasonic receiver;
a holder configured to hold the dip type probe partially outside the target liquid medium, the holder being configured to, while holding the dip type probe partially outside the target liquid medium, maintain the at least one pulse transmitter, the at least one receiver, and the at least one reflector inside the target liquid medium, the holder being configured to be carried, the holder being independent of a reservoir holding the target liquid medium, and the holder comprising at least one rigid member; and
an automated positioner, wherein the at least one reflector is coupled to the automated positioner, wherein the automated positioner is configured to move at least one of the one or more reflectors to multiple select different positions at multiple select distances from the at least one ultrasonic pulse transmitter, and, wherein the automated positioner comprises a rotating member configured to rotate a holding shaft holding the one or more reflectors and thereby change a position of the one or more reflectors to select different distances from the at least one ultrasonic pulse transmitter.

2. The apparatus according to claim 1, wherein the at least one transmitter and the at least one receiver are in the form of one or more unitary transceivers.

3. The apparatus according to claim 1, wherein the holder is configured to be carried manually.

4. The apparatus according to claim 1, wherein the holder is configured to be carried by a holder structure.

5. The apparatus according to claim 1, wherein the holder is separate from a removable vessel.

6. The apparatus according to claim 1, further comprising a portable electronics unit powered by a rechargeable battery to operate the at least one transmitter and the at least one receiver.

7. The apparatus according to claim 6, wherein the at least one pulse transmitter and the at least one receiver are configured to be a combined transceiver, such that ultrasonic pulses are received with an ultrasonic transducer that was used to transmit the ultrasonic pulses.

8. Apparatus comprising:
a dip type probe comprising at least one ultrasonic pulse transmitter configured to transmit an ultrasonic pulse through a target liquid medium, at least one ultrasonic receiver configured to receive the ultrasonic pulse transmitted through the target liquid medium, and at least one reflector configured to reflect the ultrasonic pulse transmitted through the target liquid medium in order to redirect and cause the ultrasonic pulse to reach the at least one ultrasonic receiver;
a holder configured to hold the dip type probe partially outside the target medium, the holder being configured to, while holding the dip type probe partially outside the target medium, maintain the at least one pulse transmitter, the at least one receiver, and the at least one reflector inside the target liquid medium, the holder being configured to be carried, the holder being independent of a reservoir holding the target liquid medium, and the holder comprising at least one rigid member;
wherein the one or more reflectors are coupled to, and configured to be rotated to different positions by, a stepper motor.

9. The apparatus according to claim 1, further comprising an automated positioner, wherein the at least one reflector is coupled to the automated positioner, and wherein the automated positioner is configured to move at least one of the one or more reflectors to multiple select different positions at multiple select distances from the at least one ultrasonic pulse transmitter.

10. The apparatus according to claim 9, wherein the automated positioner comprises a translation stage configured to automatically control and change the depth with which the at least one reflector is submersed in the target liquid medium, wherein the at least one reflector is controlled to be at multiple positions for each sample in order to produce attenuation data used to determine sizes of particles in the target liquid medium.

11. Apparatus comprising:
a dip type probe comprising at least one ultrasonic pulse transmitter configured to transmit an ultrasonic pulse through a target liquid medium, at least one ultrasonic receiver configured to receive the ultrasonic pulse transmitted through the target liquid medium, and at least one reflector configured to reflect the ultrasonic pulse transmitted through the target liquid medium in order to redirect and cause the ultrasonic pulse to reach the at least one ultrasonic receiver;

a holder configured to hold the dip type probe partially outside the target liquid medium, the holder being configured to, while holding the dip type probe partially outside the target liquid medium, maintain the at least one pulse transmitter, the at least one receiver, and the at least one reflector inside the target liquid medium, the holder being configured to be carried, the holder being independent of a reservoir holding the target liquid medium, and the holder comprising at least one rigid member; and a probe mount configured to hold the probe, wherein the holder is configured to be brought into contact with the probe mount when the probe is inserted into a probe slot through which the dip type probe is configured to be inserted for access to the target liquid medium, thereby controlling an extent to which the dip type probe is inserted into a sample cup supported by the sample cup support frame.

12. The apparatus according to claim 11, wherein the at least one reflector is positioned vertically below the at least one transmitter when the dip type probe is inserted into the probe slot.

* * * * *